United States Patent
Chen et al.

(10) Patent No.: US 8,490,195 B1
(45) Date of Patent: Jul. 16, 2013

(54) METHOD AND APPARATUS FOR BEHAVIORAL DETECTION OF MALWARE IN A COMPUTER SYSTEM

(75) Inventors: Joseph H. Chen, Los Angeles, CA (US); Jamie J. Park, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 703 days.

(21) Appl. No.: 12/340,125

(22) Filed: Dec. 19, 2008

(51) Int. Cl.
  *G06F 12/14* (2006.01)
(52) U.S. Cl.
  USPC ........ 726/24; 726/3; 726/12; 726/22; 726/27; 713/194; 705/51
(58) Field of Classification Search
  USPC ................ 726/1–26; 713/150–181, 187–188; 380/200–246; 705/51
  See application file for complete search history.

(56) References Cited

U.S. PATENT DOCUMENTS

| | | | |
|---|---|---|---|
| 6,016,166 A * | 1/2000 | Huang et al. | 348/515 |
| 7,076,802 B2 * | 7/2006 | Poisner | 726/22 |
| 7,484,245 B1 * | 1/2009 | Friedman et al. | 726/27 |
| 8,190,923 B2 * | 5/2012 | Daverman et al. | 713/194 |
| 2007/0186282 A1 * | 8/2007 | Jenkins | 726/22 |
| 2007/0234070 A1 * | 10/2007 | Horning et al. | 713/190 |
| 2007/0239606 A1 * | 10/2007 | Eisen | 705/51 |
| 2008/0046970 A1 * | 2/2008 | Oliver et al. | 726/3 |
| 2008/0301796 A1 * | 12/2008 | Holostov et al. | 726/12 |

* cited by examiner

*Primary Examiner* — Christopher Brown
*Assistant Examiner* — Fahimeh Mohammadi
(74) *Attorney, Agent, or Firm* — Wilmer Cutler Pickering Hale and Dorr LLP

(57) ABSTRACT

Method and apparatus for behavioral detection of malware in a computer system are described. In some embodiments, a request by a process executing on a computer to change time of a clock managed by the computer is detected. The process is identified as a potential threat. At least one attribute associated with the process is analyzed to determine a threat level. The request to change the time of the clock is blocked and the process is designated as a true positive threat if the threat level satisfies a threshold level.

9 Claims, 2 Drawing Sheets

100

METHOD AND APPARATUS FOR BEHAVIORAL DETECTION OF MALWARE IN A COMPUTER SYSTEM

BACKGROUND OF THE INVENTION

1. Field of the Invention

The present invention relates generally to computer systems. More particularly, the present invention relates to a method and apparatus for behavioral detection of malware in a computer system.

2. Description of the Related Art

Consumers and businesses increasingly rely on computers to store sensitive data. Consequently, malicious programmers seem to continually increase their efforts to gain illegitimate control and access to others' computers and sensitive data. Such malicious programmers continue to create viruses, Trojan horses, worms, and like type programs meant to compromise computer systems and sensitive data belonging to others. These malicious programs are often generally referred to as "malware".

Security software companies are combating the growing tide of malware by developing various client security products, such as anti-virus, anti-spyware, or other types of anti-malware products. Many anti-malware products are subscription-based in that users periodically pay subscription fees for the right to keep the products up-to-date with the latest detection capabilities. Once a user subscribes to a product, the product may periodically download new detection information over the Internet, such as virus definitions. Some malware threats may attempt to exploit this subscription model by modifying a computer's system clock. For example, a threat may attempt to change the year of the system clock in order to trick the security product to expire. If the security product is expired, the product will not download new detection information and may fail to adequately protect the computer against malware. In another example, a threat may change the system time in an attempt to trick the security product to believe it has up-to-date detection information, when in fact the product is using older possibly out-of-date detection information.

Accordingly, there exists a need in the art for a method and apparatus for behavioral detection of malware in a computer system that overcomes the aforementioned advantages.

SUMMARY OF THE INVENTION

Aspects of the invention relate to a method, apparatus, and computer readable medium for detecting malware on a computer. In some embodiments, a request by a process executing on the computer to change time of a clock managed by the computer is detected. The process is identified as a potential threat. At least one attribute associated with the process is analyzed to determine a threat level. The request to change the time of the clock is blocked and the process is designated as a true positive threat if the threat level satisfies a threshold level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
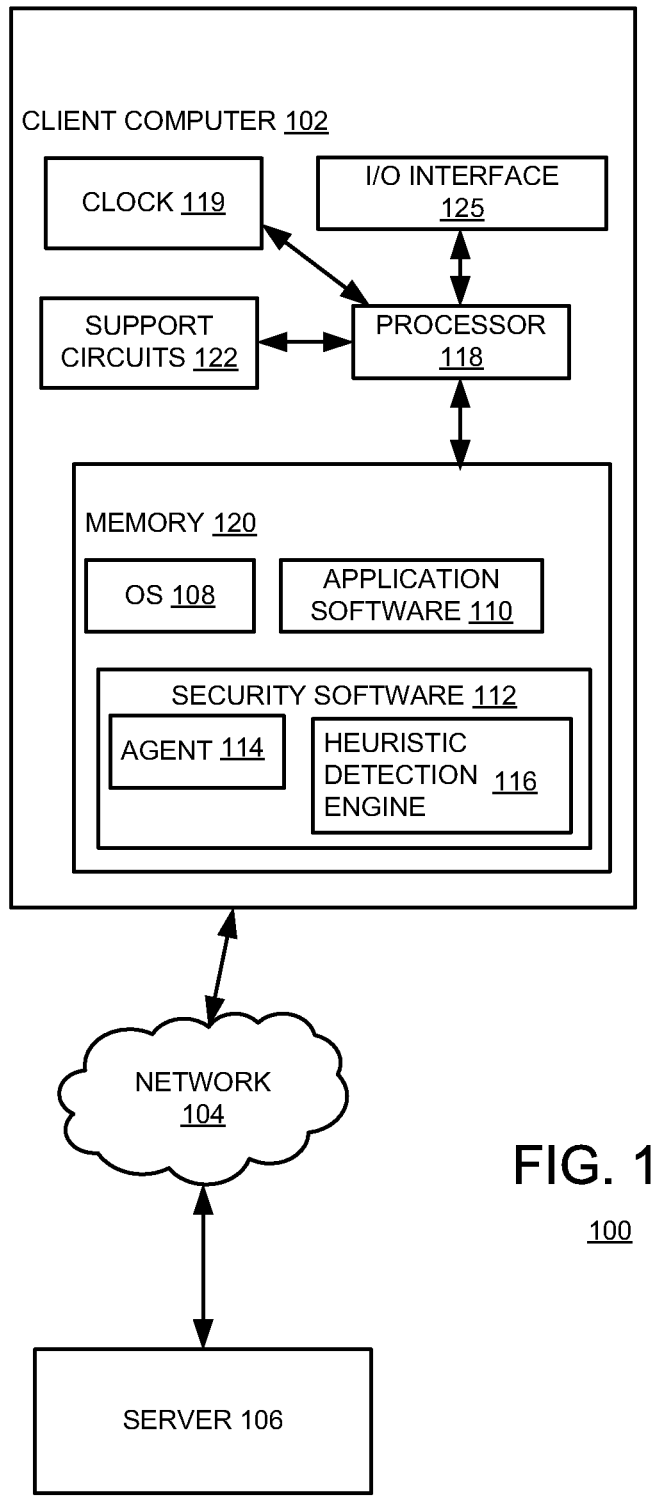
FIG. 1 is a block diagram depicting an exemplary embodiment of a computer system in accordance with one or more aspects of the invention.

FIG. 1 is a block diagram depicting an exemplary embodiment of a computer system 100 in accordance with one or more aspects of the invention. The system 100 includes a client computer 102, a network 104, and a server computer 106. The network 104 comprises a communication system that connects computer systems by wire, cable, fiber optic, and/or wireless links facilitated by various types of well-known network elements, such as hubs, switches, routers, and the like. In particular, the network 104 may connect the client computer 102 and the server computer 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like. The client computer 102 further includes a clock 119 configured to maintain a time-of-day.

The client computer 102 includes an operating system (OS) 108, application software 110, and security software 112. The operating system 108 may be any type of operating system known in the art, such as any MICROSOFT WINDOWS, APPLE MACINTOSH, or like type operating systems known in the art. Notably, the operating system 108 may be configured to manage time as maintained by the clock 119. The application software 110 may include any of a myriad of programs configured for execution within the operating system 108. The security software 112 is configured to monitor the client computer 102 to detect, isolate, and remove malware. The security software 112 may include an agent 114 and a heuristic detection engine 116. The agent 114 is configured for communication with the server 106 via the network 104. The agent 114 may be used to receive update data from the server 106 to facilitate detection of malware.

The heuristic detection engine 116 is configured to employ behavioral monitoring for malware on the client computer 102. In behavioral monitoring, the security software 112 does not attempt to identify known viruses using a signature-based approach. Rather, the security software 112 via the heuristic detection engine 116 monitors the behavior of processes executing on the client computer 102. A "process" generally relates to an execution unit in the operating system 108 spawned by software (e.g., the application software 110). The heuristic detection engine 116 employs a heuristic analysis to identify potential malware threats. The heuristic analysis deems a process to be a threat using various decision rules and/or weighting methods based on available data from the client computer 102 and/or statistics. The statistics may include data collected from other computers and distributed by the server 106.

In some embodiments, one of the decision rules employed by the heuristic detection engine 116 is a system time modification rule. In particular, the heuristic detection engine 116 monitors the operating system 108 for requests by a process to change the time of the clock 119. If the heuristic detection engine 116 detects a request to change the time of the clock 119, the requesting process is identified as a potential threat. The process is deemed a "potential" threat, since there may be some legitimate processes (i.e., not malware) attempting to change the time of the clock 119 (e.g., a user initiated time change). The heuristic detection engine 116 can then determine the potential threat to be a true positive threat or a false positive threat by applying one or more additional rules based on attributes from the client computer 102 and/or attributes received from the server 106. The heuristic detection engine 116 then determines a threat level for the process based on the applications of the system time modification rule and the additional rule(s). The outcomes of the rules applied by the heuristic detection engine 116 may be weighted using predefined weights (e.g., some rules may be deemed as more important to satisfy than other rules). The security software 112 may block the request to change the time of the clock 119 and designate the process as a true positive threat if the threat level satisfies a threshold threat level. If the threat level for the process does not satisfy the threshold threat level, the security software 112 may allow the request to change the time of the clock 119 and designate the process as a false positive threat. That is, although the process is attempting to change the time, the process is not deemed to be malware.

After flagging a process attempting to change the system time as a potential threat, any number and type of additional rule(s) may be applied by the heuristic detection engine 116. In some embodiments, one attribute analyzed by the heuristic detection engine 116 is a trustworthiness attribute associated with the process. For example, the server 106 may collect various statistics from a multiplicity of computers over the network 104 (including the client computer 102) associated with various processes. Given this vast array of statistics, the server 106 may maintain levels of trust for known processes, e.g., vendor trusted, community trusted, unknown, not trusted, etc. An exemplary technique analyzing the trustworthiness and reputation of software is described in commonly-assigned U.S. patent application Ser. No. 12/165,333, filed Jun. 30, 2008, which is incorporated by reference herein. The security software 112 may query the server 106 for trust levels of various processes flagged as potential threats through the agent 114. The heuristic detection engine 116 may apply an appropriate weight based on the trustworthiness level of a time-changing process designated as a potential threat.

In some embodiments, one or more attributes analyzed by the heuristic detection engine 116 is/are OS attribute(s) indicative of interaction between the process and the operating system 108. For example, in some embodiments, an OS attribute may be an indication of whether the process is executing in a visible window of the operating system 108. If a process is executing in a visible window, it is more likely that the process is legitimate, e.g., a process that the user initiated to change system time. If the process is not executed in a visible window and hidden from display, it is more likely that the process is not legitimate and the time change is not initiated by the user. The heuristic detection engine 116 may analyze any number of other OS attributes related to the process.

Figure 2:
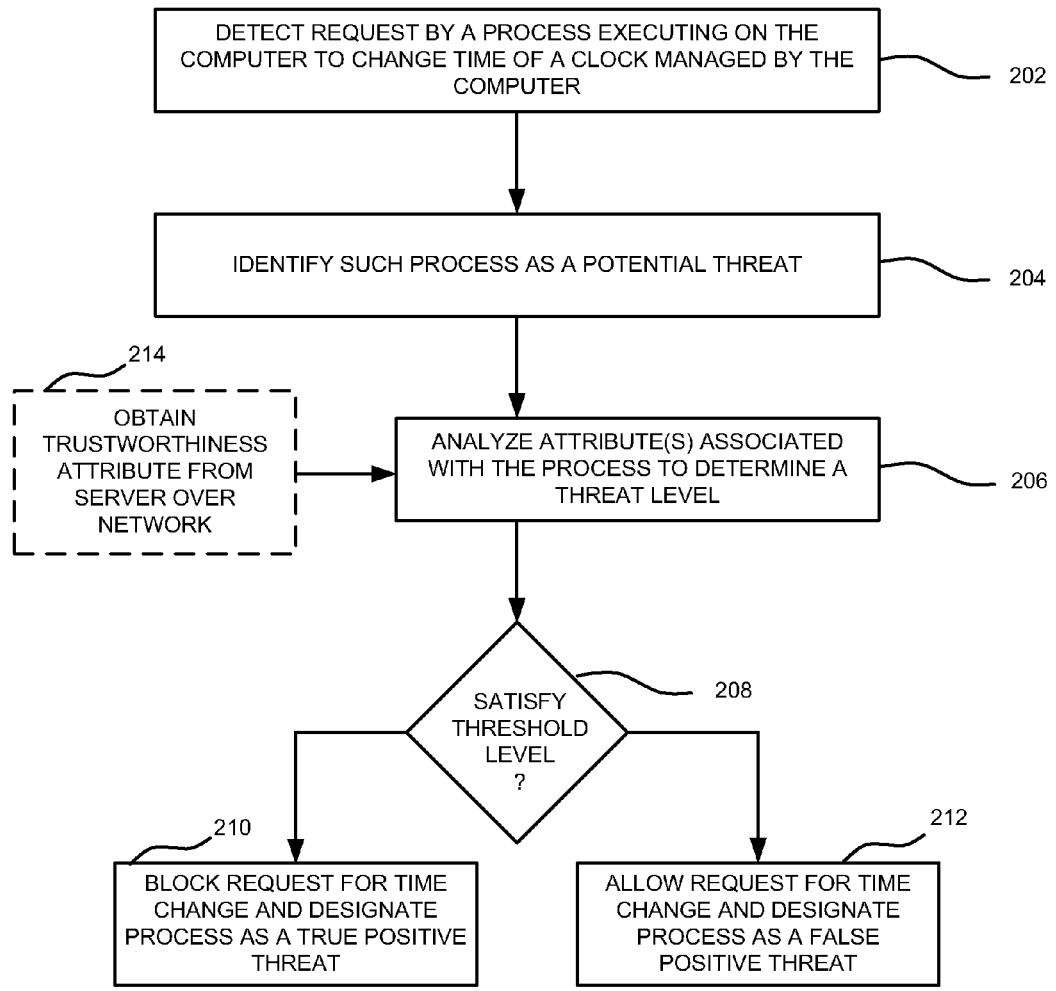
FIG. 2 is a flow diagram depicting a method of detecting malware on a computer according to some embodiments of the invention.

FIG. 2 is a flow diagram depicting a method 200 of detecting malware on a computer according to some embodiments of the invention. The method 200 begins at step 202, where a request by a process executing on the computer to change time of a clock managed by the computer is detected. At step 204, the process is identified as a potential threat. At step 206, at least one attribute associated with the process is analyzed to determine a threat level. At step 208, a determination is made whether the threat level satisfies a threshold level. If so, the method 200 proceeds to step 210, where the request to change the time of the clock is blocked and the process is designated as a true positive threat. If the threat level does not satisfy the threshold level at step 208, the method 200 proceeds to step 212. At step 212, the request to change the time of the clock is allowed and the process is designated as a false positive threat (i.e., not a threat). At optional step 214, a trustworthiness attribute for the process may be obtained from a server of a network. The trustworthiness attribute may be used at step 206 to determine the threat level of the process.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method of detecting malware on a computer, comprising:

detecting, using at least one computer processor, a request by a process executing on the computer to change time of a clock managed by the computer;

identifying the process as a potential threat;

receiving, over a network, at least one first attribute associated with the process;

analyzing the at least one first attribute associated with the process to determine a threat level, wherein the at least one first attribute comprises an attribute indicating a trustworthiness of the process;

analyzing at least one second attribute associated with the process to determine a threat level, wherein the at least one second attribute comprises at least one operating system attribute indicative of interaction between the process and an operating system executing on the computer, and wherein the at least one operating system attribute comprises an indication of whether the process is executing in a visible window of the operating system; and blocking the request to change the time of the clock and designating the process as a true positive threat if the threat level satisfies a threshold level, wherein blocking the request to change the time of the clock prevents a change in time of the clock managed by the computer.

2. The method of claim 1, further comprising:
allowing the request to change the time of the clock and designating the process as a false positive threat if the threat level does not satisfy the threshold level.

3. The method of claim 1, wherein the at least one first attribute comprises a trustworthiness attribute, and wherein the method further comprises:
obtaining the trustworthiness attribute from a server over a network.

4. An apparatus for detecting malware on a computer, comprising:
at least one computer processor configured to execute instructions to perform a plurality of actions to detect malware, the actions comprising:
detecting a request by a process executing on the computer to change time of a clock managed by the computer;
identifying the process as a potential threat;
receiving, over a network, at least one first attribute associated with the process;
analyzing the at least one first attribute associated with the process to determine a threat level, wherein the at least one first attribute comprises an attribute indicating a trustworthiness of the process;
analyzing at least one second attribute associated with the process to determine a threat level, wherein the at least one second attribute comprises at least one operating system attribute indicative of interaction between the process and an operating system executing on the computer, and wherein the at least one operating system attribute comprises an indication of whether the process is executing in a visible window of the operating system; and
blocking the request to change the time of the clock and designating the process as a true positive threat if the threat level satisfies a threshold level, wherein blocking the request to change the time of the clock prevents a change in time of the clock managed by the computer.

5. The apparatus of claim 4, the actions further comprising:
allowing the request to change the time of the clock and designating the process as a false positive threat if the threat level does not satisfy the threshold level.

6. The apparatus of claim 4, wherein the at least one first attribute comprises a trustworthiness attribute, and wherein the actions further comprise:
obtaining the trustworthiness attribute from a server over a network.

7. A non-transitory computer readable storage medium having instructions stored thereon that when executed by a processor cause the processor to perform a method of detecting malware on a computer, comprising:
detecting a request by a process executing on the computer to change time of a clock managed by the computer;
identifying the process as a potential threat;
receiving, over a network, at least one first attribute associated with the process;
analyzing the at least one first attribute associated with the process to determine a threat level, wherein the at least one first attribute comprises an attribute indicating a trustworthiness of the process;
analyzing at least one second attribute associated with the process to determine a threat level, wherein the at least one second attribute comprises at least one operating system attribute indicative of interaction between the process and an operating system executing on the computer, and wherein the at least one operating system attribute comprises an indication of whether the process is executing in a visible window of the operating system; and
blocking the request to change the time of the clock and designating the process as a true positive threat if the threat level satisfies a threshold level, wherein blocking the request to change the time of the clock prevents a change in time of the clock managed by the computer.

8. The computer readable medium of claim 7, further comprising:
allowing the request to change the time of the clock and designating the process as a false positive threat if the threat level does not satisfy the threshold level.

9. The computer readable medium of claim 7, wherein the at least one first attribute comprises a trustworthiness attribute, and wherein the method further comprises:
obtaining the trustworthiness attribute from a server over a network.

* * * * *